United States Patent
Ono et al.

(10) Patent No.: US 10,265,780 B2
(45) Date of Patent: Apr. 23, 2019

(54) DRILLING MACHINE AND METHOD OF MANUFACTURING DRILLED PRODUCT

(71) Applicant: Fuji Jukogyo Kabushiki Kaisha, Tokyo (JP)

(72) Inventors: Yuzuru Ono, Tokyo (JP); Tsukasa Yokono, Tokyo (JP); Hisayuki Hirai, Tokyo (JP); Shigeru Shibata, Yurihonjo (JP)

(73) Assignee: SUBARU CORPORATION, Tokyo (JP)

( * ) Notice: Subject to any disclaimer, the term of this patent is extended or adjusted under 35 U.S.C. 154(b) by 88 days.

(21) Appl. No.: 15/042,057

(22) Filed: Feb. 11, 2016

(65) Prior Publication Data

US 2016/0271747 A1 Sep. 22, 2016

(30) Foreign Application Priority Data

Mar. 20, 2015 (JP) ................. 2015-057768

(51) Int. Cl.
  *B23B 39/14* (2006.01)
  *B23Q 9/00* (2006.01)
  *B23Q 9/02* (2006.01)

(52) U.S. Cl.
  CPC ........... *B23B 39/14* (2013.01); *B23Q 9/0007* (2013.01); *B23Q 9/0042* (2013.01); *B23Q 9/02* (2013.01); *B23B 2215/04* (2013.01); *Y10T 408/556* (2015.01); *Y10T 408/91* (2015.01)

(58) Field of Classification Search
  CPC ... B23B 39/14; B23B 2215/04; B23Q 9/0042; B23Q 9/0007; B23Q 9/02; Y10T 408/556; Y10T 408/91
  See application file for complete search history.

(56) References Cited

U.S. PATENT DOCUMENTS

| 3,459,134 A | 8/1969 | Shepheard | |
| 3,555,961 A * | 1/1971 | Vitushkin | B23F 1/06 318/640 |
| 4,022,106 A * | 5/1977 | Kile | B23C 1/20 409/178 |

(Continued)

FOREIGN PATENT DOCUMENTS

| DE | 3508756 A1 * | 10/1985 | ............. B23B 41/00 |
| EP | 1 918 068 A1 | 5/2008 | |

(Continued)

OTHER PUBLICATIONS

Extended European Search Report dated Aug. 18, 2016 in European Application No. 16155137.9.

(Continued)

*Primary Examiner* — Eric A Gates
(74) *Attorney, Agent, or Firm* — McGinn IP Law Group, PLLC

(57) ABSTRACT

According to one implementation, a drilling machine includes a drilling structure and a travelling machine. The drilling structure drills an object to be drilled composed of at least one structural object on a platy part. The travelling machine positions the drilling structure in a travelling direction of the travelling machine by travelling in a longitudinal direction of the at least one structural object using the at least one structural object as a guide.

22 Claims, 4 Drawing Sheets

(56) References Cited

U.S. PATENT DOCUMENTS

| | | | |
|---|---|---|---|
| 5,001,818 A * | 3/1991 | Kramer | B23C 1/20 29/26 B |
| 5,070,792 A * | 12/1991 | Harris | B23K 37/0211 104/119 |
| 5,181,808 A | 1/1993 | Griggs | |
| 5,477,596 A | 12/1995 | Schlosstein et al. | |
| 6,855,099 B2 | 2/2005 | Hazlehurst | |
| 7,273,333 B2 * | 9/2007 | Buttrick, Jr. | B23Q 9/0042 408/1 R |
| 7,406,758 B2 * | 8/2008 | Jones | B23Q 9/0014 248/205.5 |
| 7,488,144 B2 * | 2/2009 | Boyl-Davis | B23B 39/14 408/1 R |
| 7,637,702 B2 | 12/2009 | Furukawa | |
| 7,677,181 B2 * | 3/2010 | Boyl-Davis | B23Q 9/0042 105/29.1 |
| 8,021,089 B2 | 9/2011 | Eriksson et al. | |
| 8,365,376 B2 * | 2/2013 | Reid | B21J 15/14 254/93 R |
| 8,657,274 B2 | 2/2014 | Hazlehurst | |
| 9,573,269 B2 * | 2/2017 | Albert | B25H 1/0057 |
| 9,597,761 B2 * | 3/2017 | Albert | B23Q 9/0014 |
| 9,623,492 B2 * | 4/2017 | Capriotti | B23C 3/28 |
| 2010/0037444 A1 * | 2/2010 | Reid | B23Q 9/0042 29/33 R |
| 2010/0040426 A1 | 2/2010 | Pettersson | |
| 2010/0054877 A1 | 3/2010 | Buttrick, Jr. et al. | |
| 2014/0216295 A1 * | 8/2014 | Herzog | E01B 31/06 104/2 |
| 2014/0339394 A1 | 11/2014 | Perla et al. | |
| 2015/0003927 A1 | 1/2015 | Spishak et al. | |
| 2015/0096777 A1 * | 4/2015 | Albert | B23Q 1/621 173/184 |
| 2015/0209927 A1 | 7/2015 | DeLand | |
| 2017/0028520 A1 * | 2/2017 | Jesu Plu | B23Q 9/0007 |
| 2017/0225239 A1 * | 8/2017 | Hirai | B23B 41/006 |

FOREIGN PATENT DOCUMENTS

| | | | |
|---|---|---|---|
| JP | S61-279405 A | | 12/1986 |
| JP | H03-098794 A | | 4/1991 |
| JP | 09285997 A | * | 11/1997 |
| JP | 2002233905 A | * | 8/2002 |
| JP | 2006-502010 A | | 1/2006 |
| JP | 2007-526134 A | | 9/2007 |
| JP | 2008-502496 A | | 1/2008 |
| JP | 2010-524711 A | | 7/2010 |
| NL | 8101079 A | | 10/1982 |
| NL | 9301721 A | * | 5/1995 ........... B23B 39/162 |
| WO | WO 99/42246 A1 | | 8/1999 |
| WO | WO 03/037564 A2 | | 5/2003 |
| WO | WO 03/037564 A3 | | 5/2003 |
| WO | WO 2005/002803 A2 | | 1/2005 |
| WO | WO 2005/002803 A3 | | 1/2005 |

OTHER PUBLICATIONS

Extended European Search Report dated Jul. 4, 2017 in European Application No. 16204635.3.

Japanese Office Action dated Dec. 4, 2018, in Japanese Patent Application No. 2015-57768 with an English translation.

Chinese Office Action dated Jan. 11, 2019, in Chinese Patent Application No. 201610140973.4 with an English Translation.

United States Office Action dated Mar. 6, 2019, in U.S. Appl. No. 15/374,750.

* cited by examiner

US 10,265,780 B2

DRILLING MACHINE AND METHOD OF MANUFACTURING DRILLED PRODUCT

CROSS REFERENCES TO RELATED APPLICATIONS

This application is based upon and claims the benefit of priority from Japanese Patent Application No. 2015-57768, filed on Mar. 20, 2015; the entire contents of which are incorporated herein by reference.

FIELD

Implementations described herein relate generally to a drilling machine and a method of manufacturing a drilled product.

BACKGROUND

Conventionally, a self-travelling drilling machine which has a travelling function has been proposed as a drilling machine which drills a part of an aircraft or the like (for example, refer to Japanese Patent Application Publication JP 2007-526134 A and Japanese Patent Application Publication JP 2006-502010 A).

An object of the present invention is to allow drilling a part of an aircraft or the like with a simpler structure.

SUMMARY OF THE INVENTION

In general, according to one implementation, a drilling machine includes a drilling structure and a travelling machine. The drilling structure drills an object to be drilled composed of at least one structural object on a platy part. The travelling machine positions the drilling structure in a travelling direction of the travelling machine by travelling in a longitudinal direction of the at least one structural object using the at least one structural object as a guide.

Further, according to one implementation, a method of manufacturing a drilled product using the above-mentioned drilling machine is provided.

Further, according to one implementation, a method of manufacturing a drilled product includes: positioning a drilling structure in a travelling direction of a travelling machine by making the travelling machine travel in a longitudinal direction of at least one structural object of an object to be drilled; and manufacturing a drilled product by drilling the object to be drilled, using the drilling structure after the positioning. The drilling structure is coupled to the travelling machine. The travelling machine travels using the at least one structural object as a guide. The object to be drilled is composed of the at least one structural object on a platy part.

DETAILED DESCRIPTION

A drilling machine and a method of manufacturing a drilled product according to implementations of the present invention will be described with reference to the accompanying drawings.

(Structure and Function)

Figure 1:
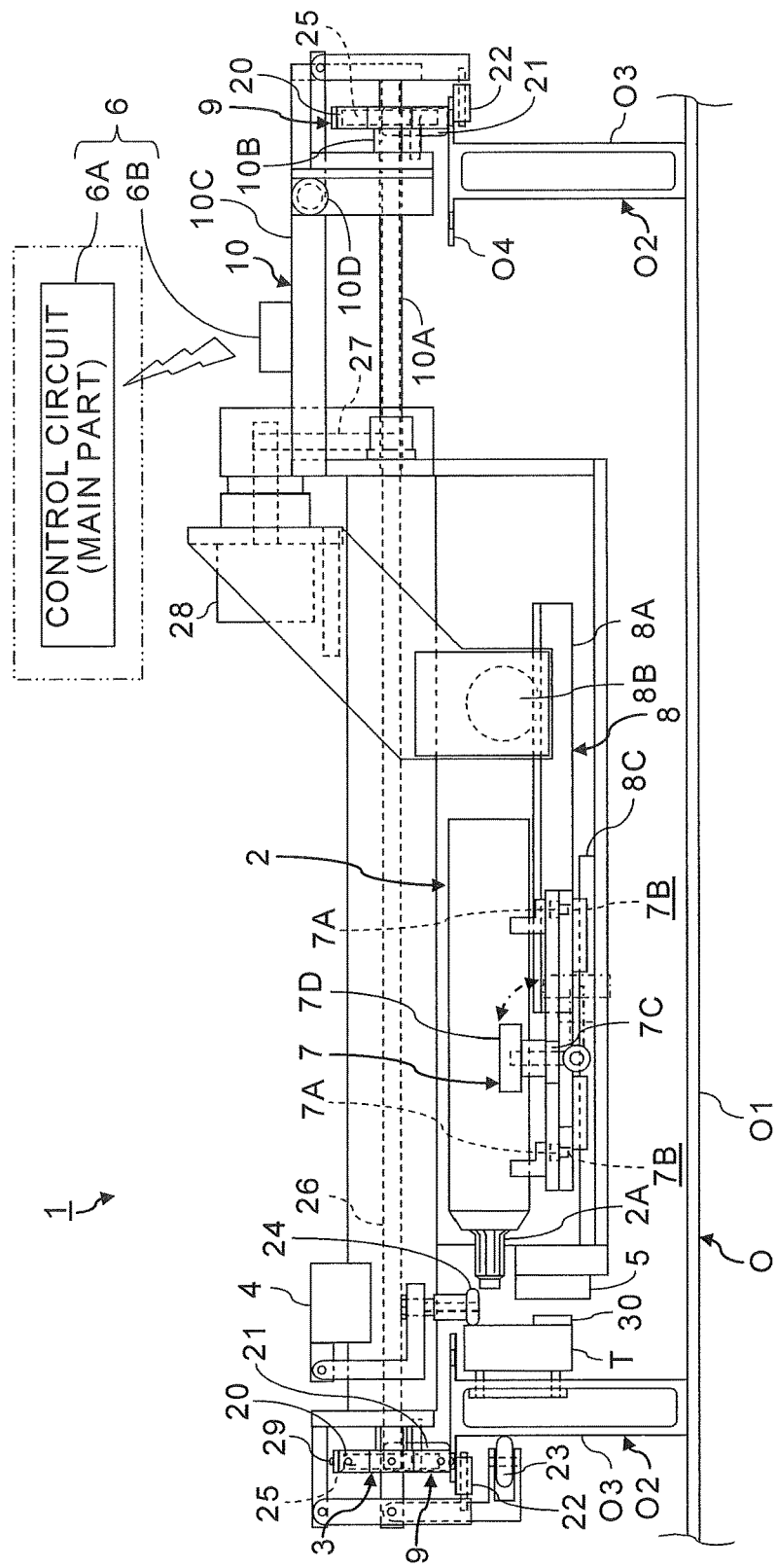
FIG. 1 is a front view showing a structure of a drilling machine according to an implementation of the present invention.
Figure 2:
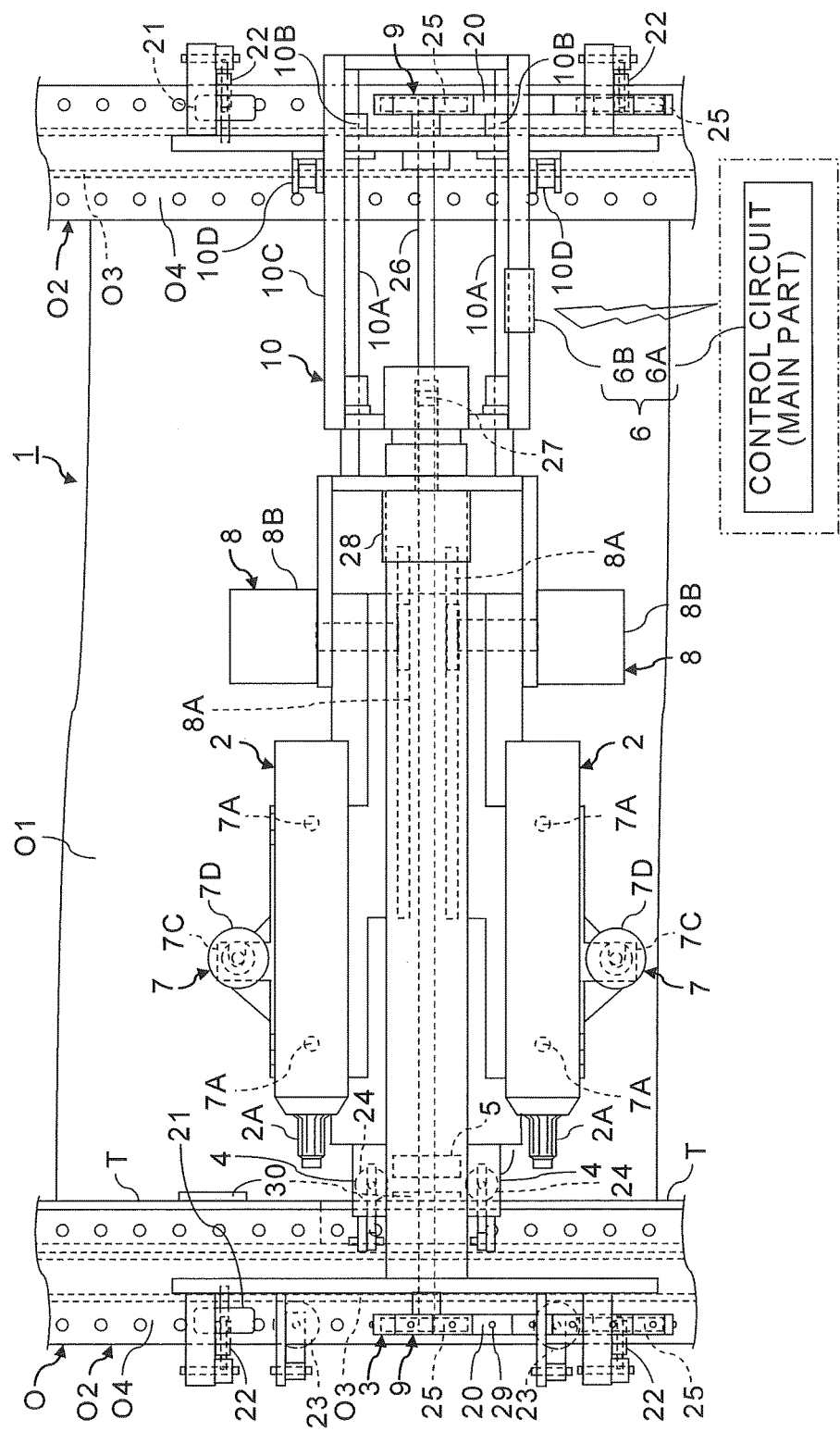
FIG. 2 is a top view showing the structure of the drilling machine shown in FIG. 1.
Figure 3:
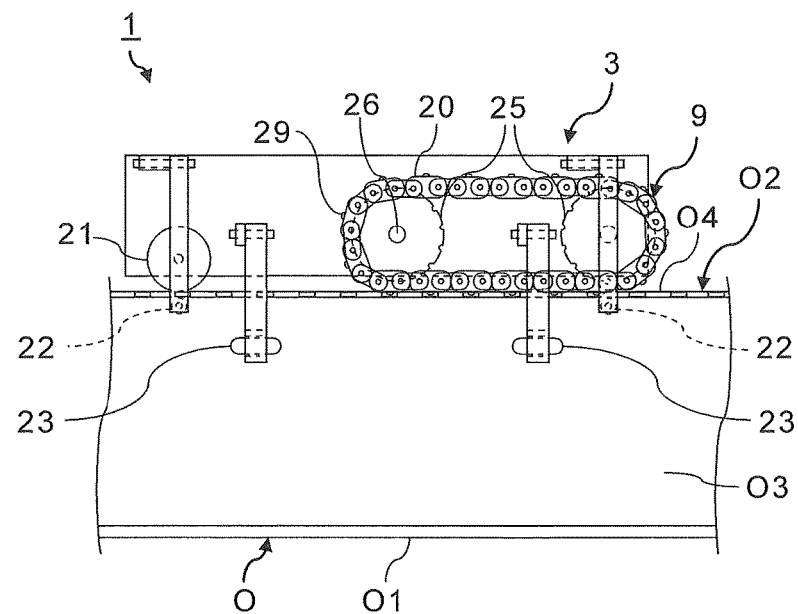
FIG. 3 is a left side view showing a structure of the first travelling structure included in the drilling machine shown in FIG. 1.
Figure 4:
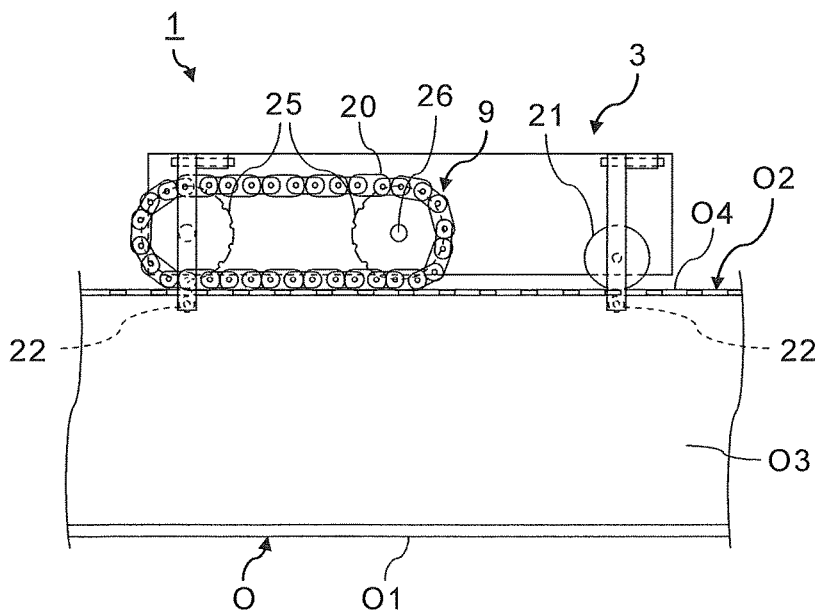
FIG. 4 is a right side view showing a structure of the second travelling structure included in the drilling machine shown in FIG. 1.

FIG. 1 is a front view showing a structure of a drilling machine according to an implementation of the present invention. FIG. 2 is a top view showing the structure of the drilling machine shown in FIG. 1. FIG. 3 is a left side view showing a structure of the first travelling structure included in the drilling machine shown in FIG. 1. FIG. 4 is a right side view showing a structure of the second travelling structure included in the drilling machine shown in FIG. 1.

A drilling machine 1 is a self-propelled automatic drilling machine which drills an object O to be drilled with travelling on the object O to be drilled. In particular, the object O to be drilled which is composed of a structural object O2 on a plate-like part O1 is a drilling target by the drilling machine 1. In the example shown in the figures, the object O to be drilled which has a structure of elongated structural objects O2, having webs O3 and flanges O4, on the plate-like part O1 is a drilling target. More specifically, portions of the webs O3 of the object O to be drilled are drilling targets. For that purpose, drilling plates T are attached to the webs O3 of the object O to be drilled.

Examples of the object O to be drilled which has a structure of having the elongated structural objects O2 attached on the plate-like part O1 include a center wing of an aircraft. The center wing is a wing disposed between the right and left main wings of an aircraft. Therefore, the center wing is located at the bottom of a fuselage of an aircraft. Thus, the center wing has a structure of having seat rails, for fixing seats, attached on a curved surface-like panel.

Therefore, when the object O to be drilled is a center wing of an aircraft on which seat rails have been attached, the object O to be drilled has a structure of having the shaped metal-like structural objects O2 whose top surfaces are flat, as seat rails, disposed on a panel which is the non-flat plate-like part O1. Other examples of the object O to be drilled include a structural object for aircraft, such as a main wing, where sub-structural objects, such as stringers, ribs, and spars, having webs and flanges have been attached on a panel.

Note that, while a shaped metal, i.e., a metal material which has a constant sectional shape, such as an I shape or an H shape, and is long in the direction of the material axis is an example of the elongated structural object O2, a shaped metal material which has a non-constant sectional shape and is long in the direction of the material axis can also be an example of the elongated structural object O2. Furthermore, a shaped metal-like structural object made of not only a metal material but also a composite material can also be an example of the elongated structural object O2.

The drilling machine 1 can be composed of at least one drilling structure 2, at least one travelling machine 3, at least one position sensor 4, at least one IC (integrated circuit) tag reader 5, and a controlling device 6. Elements which perform information processing and/or control out of the elements composing the drilling machine 1 can be configured by circuitry, such as a computer.

The drilling structure 2 is a device which drills the object O to be drilled with holding a tool, such as a drill. In the example shown in the figures, the drilling machine 1 has the two drilling structures 2. Therefore, drilling can be performed with two kinds of sizes. Each of the drilling structures 2 is a drill driving device which can perform a rotation and a feed of a tool, such as a drill.

Each of the drilling structures 2 may also have a supply structure of a cutting oil and/or a dust collection structure for collecting chips, as necessary. Methods of supplying a cutting oil include a method of supplying a cutting oil through inside a tool, such as a drill, and a method of disposing a nozzle for supplying a cutting oil outside a tool.

A general drill driving device which can operate a rotation, a feed, a return, and cutting oil supply by air signals from a single air supply system has been on the market. Therefore, when a commercially available air type drill driving device is diverted as the drilling structure 2, manufacturing costs of the drilling machine 1 can be reduced. Note that, not only limited to an air type structure but also a hydraulic structure or a structure driven by electric control may also be used in order to operate an arbitrary part of the drilling structure 2.

It is preferable to dispose a collet 2A on each head of the drilling structures 2 as shown in the figures. The collet 2A is a device which clamps the head of the drilling structure 2 to the drilling plate T in a state where the collet 2A has been inserted in the drilling plate T. Specifically, when the tip of the head of the drilling structure 2 is pressed into the collet 2A which has been inserted in the drilling plate T, the collet 2A is pushed and expanded outside, thereby the head of the drilling structure 2 can be fixed to the drilling plate T through the collet 2A.

Each of the drilling structures 2 is coupled directly or indirectly to the travelling machine 3 by a removable structure 7. In the example shown in the figures, each of the drilling structures 2 has been indirectly coupled to the travelling machine 3 through a feed structure 8, by the removable structure 7.

The feed structure 8 is a device to move the drilling structure 2 itself in the tool axis direction. For example, each of the feed structures 8 can be composed of a rack and pinion 8A, a feed motor 8B for rotating the pinion side of the rack and pinion 8A, and a feed guide 8C which guides a movement of the drilling structure 2. The rack is a toothed linear bar on which a gear cutting has been performed while the pinion is a small-diameter circular gear which meshes with the rack. Specifically, the drilling structure 2, which has been installed slidably along the feed guide 8C, is fixed to the rack side of the rack and pinion 8A. Meanwhile, the pinion of the rack and pinion 8A is rotated by the feed motor 8B. Thereby, the drilling structure 2 can be fed out in the tool axis direction of the drilling structure 2.

When a feeding operation of a tool is performed only by a feed function of tool provided in each of the drilling structures 2, the feed structure 8 may be omitted. Nevertheless, when the feed structure 8 of the drilling structure 2 is provided to the drilling machine 1, interference between the head of the drilling structure 2 and the structural object O2 can be avoided even when the structural object O2 has concavity and convexity in the tool axis direction.

The removable structure 7 can be composed of positioning pins 7A, positioning holes 7B, a hook 7C, and a fixing knob 7D. The positioning pins 7A and the hook 7C are disposed in the drilling structure 2 side. Meanwhile, the positioning holes 7B and the fixing knob 7D are disposed in a target side to which the drilling structure 2 is attached. In the example shown in the figures, the drilling structures 2 are attached to the feed structures 8 respectively. Therefore, the positioning holes 7B and the fixing knob 7D are disposed on each of the feed structures 8.

Two sets of the positioning pin 7A and the positioning hole 7B are disposed so that the positioning pins 7A can be inserted into the positioning holes 7B, respectively. Therefore, the drilling structure 2 can be positioned by inserting the two positioning pins 7A into the positioning holes 7B respectively.

The fixing knob 7D is configured to enable to be pulled up like a lever by a rotating shaft. When the fixing knob 7D is pulled up in a state where the drilling structure 2 has been positioned by the two sets of the positioning pin 7A and the positioning hole 7B, the fixing knob 7D engages with the hook 7C attached to the drilling structure 2. Therefore, the drilling structure 2 can be fixed to the feed structure 8 by engagement between the fixing knob 7D and the hook 7C. That is, the drilling structure 2 can be positioned by the positioning pins 7A, and can be simply attached to the feed structure 8 and detached from the feed structure 8 by operating the fixing knob 7D.

The feed structure 8 which is a target to attach and detach the drilling structure 2 is coupled to the travelling machine 3. The travelling machine 3 is a device which positions the drilling structure 2 in the travelling direction of the travelling machine 3 by travelling in the longitudinal direction of the elongated structural object O2 of the object O to be drilled, using the elongated structural object O2 as a guide. The travelling machine 3 can be composed using plural travelling structures 9 and an adjusting structure 10. Each of the travelling structures 9 is a device which travels using the elongated structural object O2 of the object O to be drilled as a guide. Meanwhile, the adjusting structure 10 is a device which adjusts an interval between the travelling structures 9.

In the example shown in the figures, the travelling machine 3 has the two travelling structures 9 according to positions of the two elongated structural objects O2, respectively. Note that, more than two travelling structures 9 may be provided according to positions of more than two elongated structural objects O2. Alternatively, when more than two elongated structural objects O2 exist, two travelling structures 9 may be provided according to positions of arbitrary two elongated structural objects O2. That is, the travelling machine 3 can be composed of the plural travelling structures 9 which propel on at least two elongated structural objects O2 respectively. Hereinafter, an example case where the travelling machine 3 has the two travelling structures 9 as shown in the figures will be described.

When the travelling machine 3 is provided with the adjusting structure 10 which adjusts an interval of the two travelling structures 9, the travelling machine 3 can travel using two selected elongated structural objects O2 as guides even when the object O to be drilled has more than two elongated structural objects O2 disposed at different intervals. For example, the adjusting structure 10 can be composed of cylindrical sliders 10B, which slide along two rods 10A respectively, and a frame 10C, to which the cylindrical sliders 10B are coupled, as shown in the figures. Specifically, a width of the adjusting structure 10 can be expanded or contracted by sliding the frame 10C along the two rods 10A in the longitudinal direction of the rods 10A. The frame 10C can be fixed to the rods 10A side by stoppers 10D. Therefore, when the adjusting structure 10 is disposed between the two travelling structures 9, an interval of the two travelling structures 9 can be adjusted by expansion and contraction of the adjusting structure 10.

Each of the travelling structures 9 can be composed of a roller, a chain or the like. In the example shown in the figures, each of the travelling structures 9 has a chain 20 and a support roller 21 which travel on the flange O4 being the top surface of the elongated structural object O2, and underside guide rollers 22 which guide the undersurface of the flange O4. Furthermore, the travelling structure 9 in the drilling plate T side has external side rollers 23, which travel with contacting the web O3 from the horizontal direction, and internal side rollers 24, which travel with contacting the drilling plate T from the horizontal direction.

The chain 20 which travels on the flange O4 is adapted to be driven by two sprockets 25 (gears which engage with the chain 20). Then, one sprocket 25 is fixed to one end of a drive shaft 26. Since each of the two travelling structures 9 has the chain 20 which travels on the flange O4, one sprockets 25 out of two sets of the two sprockets 25 included in the travelling structures 9 are to be fixed to both ends of the drive shaft 26. As a result, the sprockets 25 of the two travelling structures 9 are coupled to each other by the drive shaft 26.

The drive shaft 26 of the sprockets 25 is coupled to a travelling motor 28 with a belt 27. Therefore, when the travelling motor 28 is driven, a rotative power is transmitted to the drive shaft 26 by the belt 27. Thereby, the two sprockets 25 as two wheels rotate with the drive shaft 26 so that the two chains 20 can be driven in the travelling direction along the longitudinal direction of the elongated structural objects O2. That is, the travelling machine 3 can travel in the travelling direction along the longitudinal direction of the elongated structural objects O2 by a drive of the chains 20.

Furthermore, the travelling machine 3 is guided by the support rollers 21, the underside guide rollers 22, the external side rollers 23, and the internal side rollers 24 so that the travelling machine 3 can certainly travel along the elongated structural object O2. That is, even when the elongated structural object O2 has a complicated structure, such as a seat rail, which is not a rail for travelling originally, the elongated structural object O2 can be used as a rail for travelling by the travelling structure 9 which has a structure astride the elongated structural object O2.

When the elongated structural object O2 is a seat rail, holes are formed on the flange O4 along the longitudinal direction. Specifically, when the object O to be drilled is a panel on which seat rails are attached, the object O to be drilled has a structure in which at least one elongated structural object O2 having holes along the travelling direction of the travelling machine 3 is attached on the plate-like part O1.

Accordingly, projections 29, such as pins, which fit into the holes formed on at least one elongated structural object O2, such as a seat rail, can be formed on at least one travelling structure 9 of the travelling machine 3. Thereby, dropping of the travelling structure 9 or the travelling structures 9 can be prevented. In the example shown in the figures, the chain 20 of one travelling structure 9 has the projections 29 which fit into holes formed on the upper surface of the elongated structural object O2. Note that, the projections 29 may also be formed on the support roller 21.

The chain 20 has a portion which linearly contacts on the upper surface of the elongated structural object O2, unlike a roller. Thus, the projections 29 which simultaneously fit into at least two holes out of the holes formed on the upper surface of the elongated structural object O2 can be formed on the chain 20. Thereby, the travelling direction of the chain 20 can be directed to an array direction of the holes formed on the upper surface of the elongated structural object O2. In addition, a tool axis direction can be kept to be constant relative to the array direction of the holes of the elongated structural object O2.

Similarly, when the travelling structure 9 has a travelling mechanism, such as a metal crawler or a belt, which contacts on the upper surface of the elongated structural object O2 linearly or planarly in the longitudinal direction, instead of the chain 20, the projections 29 which simultaneously fit into at least two holes out of the holes formed on the upper surface of the elongated structural object O2 can be also formed on the travelling structure 9.

When the elongated structural object O2 is a seat rail, through holes are generally formed linearly in the longitudinal direction at an equal interval. Therefore, when an interval of the projections 29 of the travelling structure 9 is determined according to a pitch of the through holes, the projections 29 can be simultaneously fit into at least two holes of a seat rail. Furthermore, even when holes are formed on the top surface of the elongated structural object O2 at unequal intervals, the projections 29 can be simultaneously fit into at least two holes by forming the projections 29 on the travelling structure 9 at an interval corresponding to the least common multiple of the intervals of the holes.

Thereby, a travelling direction of the travelling structure 9 and a tool axis direction can be directed to appropriate directions using the elongated structural object O2, such as a seat rail, which is not a rail for travelling originally. Specifically, the travelling structure 9 can be made to travel on the basis of the holes formed on the top surface of the elongated structural object O2 while the tool axis direction can also be fixed. In addition, a slipping and a dropping of the travelling structure 9 can also be prevented certainly.

Note that, it is desirable to form the projections 29 only on one travelling structure 9. This is because array directions of holes formed on the two elongated structural objects O2 on which the travelling structures 9 travel are not necessarily parallel. Specifically, when the projections 29 are formed only on one chain 20 as shown in the figures, a travelling direction of the travelling structures 9 and a tool axis direction can be appropriate directions on the basis of an array direction of holes formed on the elongated structural object O2 on which the chain 20 with the projections 29 travels even when an array direction of holes formed on the elongated structural object O2 on which the other chain 20 travels differs from the array direction of the holes formed on the elongated structural object O2 on which the chain 20 with the projections 29 travels. More specifically, when a travelling direction of the travelling structures 9 is perpendicular to a tool axis direction, a direction of tool can be constantly perpendicular to an array direction of holes formed on the elongated structural object O2.

The similar applies to a case where the travelling machine 3 has more than two travelling structures 9. That is, when the travelling machine 3 has the plural travelling structures 9 which travel at positions far from each other in a direction different from a travelling direction, it is appropriate to form the projections 29, which simultaneously fit into at least two holes out of holes of the elongated structural object O2, only on one travelling structure 9 out of the travelling structures 9. Then, the travelling machine 3 can be made to travel using one elongated structural object O2, arbitrarily selected from the elongated structural objects O2, as a guide.

Furthermore, the external side rollers 23, which travel with contacting the web O3 from the horizontal direction, and the internal side rollers 24, which travel with contacting the drilling plate T from the horizontal direction, can also be disposed only in the travelling structure 9 in the drilling plate T side. Thereby, even when the webs O3 of the elongated structural objects O2 are not parallel to each other, the external side rollers 23 and the internal side rollers 24 can be made to travel on only one elongated structural object O2 arbitrarily selected from the elongated structural objects O2 and the drilling plate T attached to the selected elongated structural object O2.

The drilling machine 1 can further have the position sensors 4 and the IC tag reader 5 to allow automatically controlling travelling of the travelling machine 3 and drilling by the drilling structures 2. Each position sensor 4 detects a position of the drilling plate T attached to the object O to be drilled. Meanwhile, the IC tag reader 5 is an information reading device which reads information recorded in each IC tag 30 attached directly or indirectly to the object O to be drilled. In the example shown in the figures, the IC tags 30 are attached to the drilling plates T.

Figure 5:
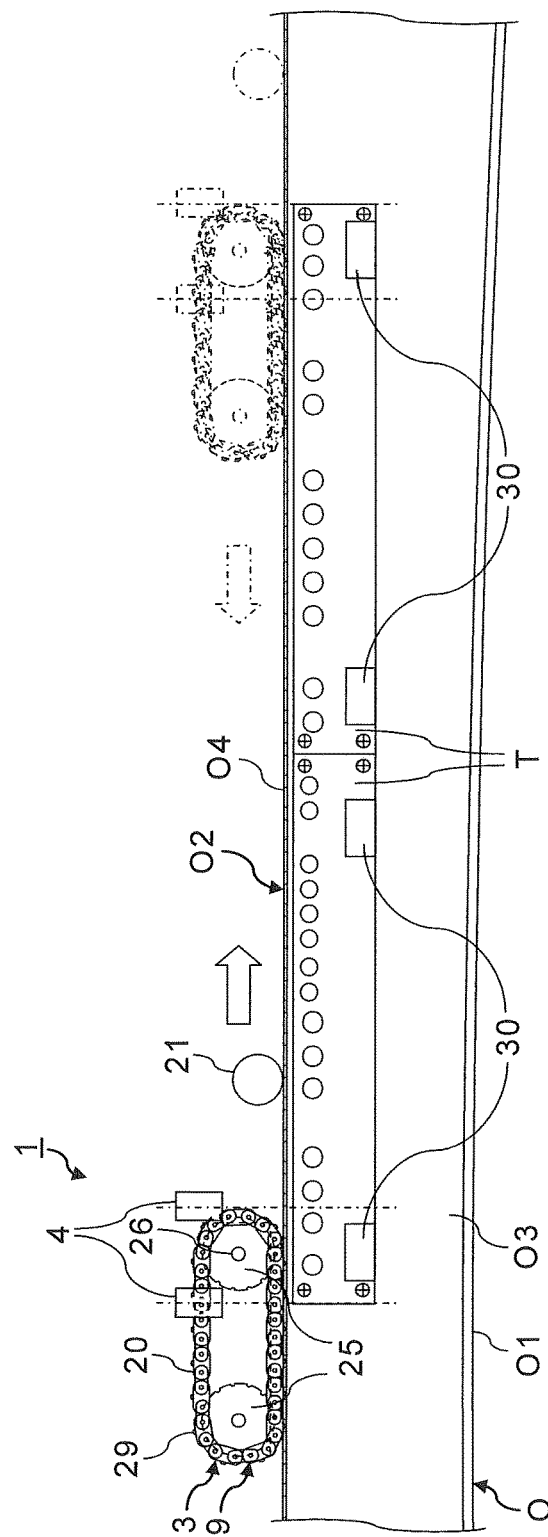
FIG. 5 shows the drilling plates T shown in FIG. 1 as viewed from the right direction.

FIG. 5 shows the drilling plates T shown in FIG. 1 as viewed from the right direction.

As shown in FIG. 5, the platy drilling plates T can be attached to the drilling side of the web O3 with fastening tools, such as bolts, along the longitudinal direction of the elongated structural object O2. In the example shown in the figures, the two drilling plates T have been disposed side by side with each other. The through holes for guide, corresponding to drilling positions of the elongated structural object O2, are formed on each drilling plate T. In addition, the IC tags 30 can be attached on each drilling plate T.

The position sensors 4 can be configured by laser displacement sensors each irradiating a laser toward the top surface of each drilling plate T. Then, the end portions of the drilling plates T can be detected by the position sensors 4. Specifically, an existing range of the drilling plates T can be detected by a binary detected signal showing whether a laser reflected on the top surface of the drilling plate T has been detected by the position sensor 4.

In the example shown in the figures, the drilling machine 1 has the position sensor 4 for detecting one end portion of the combined drilling plates T and the position sensor 4 for detecting the other end portion of the drilling plates T. As described above, detecting not the object O to be drilled but the drilling plates T each disposed as a drilling jig makes it possible to detect a relative positional relationship between the object O to be drilled and the drilling machine 1, using the simple and common position sensors 4, regardless of a structure of the object O to be drilled.

Each IC tag 30 attached on the drilling plates T records information for identifying (ID information) the corresponding drilling plate T and information for selecting the drilling structure 2. Since the number of the drilling structures 2 is two, the two IC tags 30 corresponding to the two drilling structures 2 have been attached on each of the drilling plates T in the example shown in FIG. 5. The IC tags 30 on the drilling plates T allow automatic control including automatic travelling and automatic drilling of the drilling machine 1 using RFID (radio frequency identifier) technique. The RFID is the technique which obtains ID information by wireless from an RF tag, such as an IC tag, in which the ID information has been recorded.

The IC tag reader 5 of the drilling machine 1 is disposed at a position at which the IC tag reader 5 can read IC tag information from each of the IC tags 30 attached on the drilling plates T. The IC tag information, including the ID information of the drilling plate T and the information for selecting the drilling structure 2, which have been read by the IC tag reader 5, is transferred to the controlling device 6 by wireless. Similarly, the positional information of an end portion of the drilling plates T detected by any one of the position sensors 4 is also transferred to the controlling device 6 by wireless.

The controlling device 6, which is configured by electronic circuitry, such as a computer, controls each element of the drilling machine 1. Specifically, the controlling device 6 controls drives of the drilling structures 2, drives of the feed structures 8, and travelling of the travelling machine 3. From a viewpoint of a weight reduction of a load to be mounted on the travelling machine 3, the controlling device 6 can remotely control the drilling structures 2, the feed structures 8, and the travelling machine 3 with wireless, instead of loading the whole controlling device 6 on the travelling machine 3.

In that case, the controlling device 6 can be composed of a main part 6A and a control signal receiver 6B. The main part 6A is not loaded on the travelling machine 3. Meanwhile, the control signal receiver 6B is loaded on the travelling machine 3 and performs wireless communication with the main part 6A. In the example shown in the figures, the control signal receiver 6B has been disposed above the adjusting structure 10 which adjusts an interval of the travelling structures 9.

The main part 6A of the controlling device 6 has a function to remotely control the travelling machine 3, the feed structures 8, and the drilling structures 2 based on positions of the drilling plates T, which have been detected by the position sensors 4 attached on the travelling machine 3, and information read by the IC tag reader 5. That is, the main part 6A has a function to generate control signals of the drilling structures 2, the feed structures 8, and the travelling machine 3, based on the positions of the drilling plates T detected by the position sensors 4 and the information read by the IC tag reader 5, and to transmit the generated control signals to the control signal receiver 6B by wireless.

Meanwhile, the control signal receiver 6B of the controlling device 6 has a function to receive the respective control signals of the drilling structures 2, the feed structures 8, and the travelling machine 3, transmitted from the main part 6A by wireless, and output the control signals to target devices respectively. Specifically, the drilling structures 2, the feed structures 8, and the travelling machine 3 are configured to be driven according to control signals output from the control signal receiver 6B. Note that, control signals output from the control signal receiver 6B to a device driven by compressed air may also be air signals.

The position sensors 4 detect positions of the both end portions of the drilling plates T. Therefore, the travelling direction of the travelling machine 3 can be controlled based on the positions of the drilling plates T detected by the position sensors 4. Specifically, when one end portion of the drilling plates T has been detected, a control signal which directs stop of the travelling machine 3 or reversal of the travelling direction of the travelling machine 3 can be transmitted from the main part 6A to the control signal receiver 6B by wireless. Thereby, when the travelling machine 3 has arrived at one end portion of the drilling plates T, the travelling machine 3 can be made to stop or reverse the travelling direction immediately. Thus, dropping of the travelling machine 3 can be prevented by the remote control in addition to the mechanical structure.

Meanwhile, ID information of the drilling plate T and information for selecting the drilling structure 2, which have been read by the IC tag reader 5, are used for specifying drilling positions. For that purpose, information showing a relationship between ID information of each drilling plate T and drilling positions is previously stored in the main part 6A.

In the case of drilling holes, having a specific diameter, arranged on a straight line, the drilling positions can be expressed as one-dimensional positional information, i.e., a pitch between adjacent holes or distances from a reference position to the respective holes. Therefore, storing a table, showing a relationship between sets of ID information of the drilling plates T and sets of one-dimensional drilling positions, in the main part 6A makes it possible to specify drilling positions based on ID information of a certain drilling plate T.

In the example shown in FIG. 5, holes, which have two diameters, arranged on straight lines different from each other are drilling targets of the object O to be drilled. Accordingly, holes having two diameters have, also been arranged on straight lines different from each other on the two drilling plates T.

Thus, the holes having one diameter can be determined to drilling targets by one drilling structure 2 while the holes having the other diameter can be determined to drilling targets by the other drilling structure 2. Then, holes having two kinds of sizes can be formed on the elongated structural object O2 by making the travelling machine 3 reciprocate on the elongated structural objects O2. That is, one drilling structure 2 can process holes having one diameter in the outward path of the travelling machine 3 while the other drilling structure 2 can process holes having the other diameter in the return path of the travelling machine 3. When a position in the height direction of holes having one diameter is different from a position in the height direction of holes having the other diameter, the drilling structures 2 may be provided with an adjusting structure for adjusting their positions in the height direction.

In this case, the positions of the holes, having one diameter, on the drilling plates T are drilling positions by one drilling structure 2 while the positions of the holes, having the other diameter, on the drilling plates T are drilling positions by the other drilling structure 2. Thus, the IC tag 30 on which information for selecting one drilling structure 2 and ID information of the drilling plate T have been recorded can be attached on the end portion of the corresponding drilling plate T where the IC tag reader 5 can read the information recorded on the IC tag 30 when the one drilling structure 2 is on an initial position before a start of drilling, as exemplified in FIG. 5. Similarly, the IC tag 30 on which information for selecting the other drilling structure 2 and ID information of the drilling plate T have been recorded can also be attached on the end portion of the corresponding drilling plate T where the IC tag reader 5 can read the information recorded on the IC tag 30 when the other drilling structure 2 is on an initial position before a start of drilling.

Thereby, drilling positions can be specified in the main part 6A, at a drilling start time, based on information for selecting the drilling structure 2 and ID information of the drilling plate T. That is, when a position of one drilling structure 2 has become an initial position before a start of drilling, positions to be drilled can be specified.

When the drilling positions are specified, control signals which instruct movement distances of the travelling machine 3 and control signals which instruct operations of the drilling structure 2 and the feed structure 8 to be driven can be generated. Then, the generated control signals can be output from the main part 6A, through the control signal receiver 6B, to the travelling machine 3, the feed structure 8, and the drilling structure 2.

As described above, fixing the drilling plates T, to which the IC tags 30 have been attached, to the object O to be drilled and installing the position sensors 4 and the IC tag reader 5 in the travelling machine 3 allow remote operations of the drilling structures 2, the feed structures 8, and the travelling machine 3. That is, automatic control, including automatic travelling, of the drilling machine 1 can be performed using the elongated structural object O2, such as a seat rail, which is not a rail for travelling originally, as a guide.

(Operation and Action)

Next, a method of manufacturing a drilled product using the drilling machine 1 will be described.

In the case of manufacturing a drilled product using the drilling machine 1, the drilling plates T, to which the IC tags 30 have been attached, are attached to the elongated structural object O2 of the object O to be drilled, as shown in FIG. 5. ID information of a corresponding drilling plate T and information for selecting one of the drilling structures 2 are previously stored in each IC tag 30. Note that, information showing a size of holes may be stored instead of the information for selecting the drilling structure 2.

Meanwhile, drills according to sizes of holes to be drilled are installed to the drilling structures 2, respectively. The drills can be installed in a state where the drilling structures 2 have been detached from the travelling machine 3, respectively. When the drills are installed to the drilling structures 2, respectively, each of the drilling structures 2 is installed to the feed structure 8 by the removable structure 7. Thereby, the drilling structures 2 are coupled to the travelling machine 3.

Next, the travelling machine 3 equipped with the drilling structures 2 are placed on the elongated structural objects O2 of the object O to be drilled. When at least one of the elongated structural objects O2 has holes at a predetermined interval on the top surface, like a seat rail attached to a center wing of an aircraft, the projections 29 formed on one travelling structure 9 are inserted into the holes of one elongated structural object O2. Thereby, drilling can be started with directing a travelling direction of the travelling structures 9 to the array direction of the holes formed on the elongated structural object O2, and preventing a dropping of the travelling structures 9 from the elongated structural objects O2.

Next, ID information of the drilling plate T and information for selecting one drilling structure 2, which have been recorded on the IC tag 30 of the drilling plate T, are read by the IC tag reader 5 attached to the travelling machine 3. The ID information of the drilling plate T and the information for selecting one drilling structure 2, which have been read by the IC tag reader 5, are transferred to the main part 6A of the controlling device 6 by wireless. Then, the main part 6A specifies drilling positions corresponding to the one selected drilling structure 2, by referring to reference information which relates pieces of the ID information of the drilling plates T with sets of drilling positions.

Subsequently, the main part 6A generates control signals, which instruct the travelling machine 3 to move to the specified drilling positions, and control signals, which instruct respective drives of the one selected drilling structure 2 and the corresponding feed structure 8. The respective generated control signals are transmitted from the main part 6A to the control signal receiver 6B by wireless.

Then, the control signal receiver 6B instructs the travelling machine 3 to move to the drilling positions by the control signals. Thereby, the travelling machine 3 travels in the longitudinal direction of the elongated structural object O2 of the object O to be drilled, using the elongated structural object O2 as a guide. When the travelling machine 3 arrives at the initial drilling position, the travelling machine 3 is stopped. Thereby, the drilling structure 2 coupled to the travelling machine 3 can be positioned in the travelling direction. At this time, when it is a state where at least two projections 29 of the travelling structure 9 have been simultaneously inserted into holes of the elongated structural object O2, the tool axis direction of the drilling structure 2 can be directed perpendicular to the array direction of the holes formed on the elongated structural object O2.

After the selected drilling structure 2 is positioned, the control signal receiver 6B gives driving signals to the drilling structure 2 and the feed structure 8, respectively. Thus, the drilling structure 2 is given a feeding operation by a drive of the feed structure 8. Then, drilling at the initial drilling position of the elongated structural object O2 can be performed by a drive of the drilling structure 2. When the drilling at the initial drilling position is completed, the drill attached to the drilling structure 2 returns to the initial position, and the drilling structure 2 also returns to the initial position by a drive of the feed structure 8.

Then, positioning of the drilling structure 2 by travelling of the travelling machine 3 and drilling by drives of the drilling structure 2 and the feed structure 8 are sequentially performed for each drilling position in a similar flow. Thereby, drilling at each drilling position by the first selected drilling structure 2 can be performed.

When the travelling machine 3 travels to near the end portion of the elongated structural object O2, the end portion of the drilling plate T is detected by one of the position sensors 4. When the end portion of the drilling plate T is detected by the position sensor 4, detection information of the end portion of the drilling plate T is transferred to the main part 6A of the controlling device 6 by wireless. Then, the main part 6A generates a control signal for inverting the travelling direction of the travelling machine 3.

Meanwhile, ID information of the drilling plate T and information for selecting the other drilling structure 2, which have been recorded on the IC tag 30 disposed near the end portion of the drilling plate T, are read by the IC tag reader 5. The ID information of the drilling plate T and the information for selecting the other drilling structure 2, which have been read by the IC tag reader 5, are transferred to the main part 6A of the controlling device 6 by wireless. Then, the main part 6A specifies drilling positions corresponding to the other drilling structure 2 by referring to the reference information which relates the pieces of the ID information of the drilling plates T with the sets of the drilling positions.

Then, the main part 6A generates control signals, which instruct the travelling machine 3 to move to the specified drilling positions, and control signals, which instruct respective drives of the other selected drilling structure 2 and the corresponding feed structure 8. The generated respective control signals are transmitted from the main part 6A to the control signal receiver 6B by wireless.

Then, drilling by the other drilling structure 2 is performed at each drilling position in a flow similar to that of the drilling by the first selected drilling structure 2. Specifically, positioning of the other drilling structure 2 by travelling of the travelling machine 3 and drilling by drives of the other drilling structure 2 and the feed structure 8 are sequentially performed for each drilling position. After that, when the travelling machine 3 travels to near the end portion of the elongated structural object O2, the end portion of the drilling plate T is detected by the other one of the position sensors 4. When the end portion of the drilling plate T is detected by the position sensor 4, detection information of the end portion of the drilling plate T is transferred to the main part 6A of the controlling device 6 by wireless.

Then, the main part 6A generates a control signal for stopping travelling of the travelling machine 3. The generated control signal is output to the travelling machine 3 through the control signal receiver 6B by wireless. Thereby, the travelling machine 3 is stopped and the drilling of the elongated structural object O2 can be completed.

Note that, when a plurality of elongated structural objects O2 are objects to be drilled by the drilling machine 1, drilling can be performed similarly by attaching the drilling plates T and placing the travelling machine 3, equipped with the drilling structures 2, on the next elongated structural object O2 to be drilled. Then, when drilling of the all elongated structural objects O2 to be drilled by the drilling machine 1 is completed, a drilled product can be obtained. That is, a drilled product can be manufactured.

As described above, the drilling machine 1 and a method of manufacturing a drilled product allow to drill an object O to be drilled, having a structure in which elongated structural objects O2 are disposed on a plate-like part O1 like a center wing having seat rails of an aircraft, with travelling using at least one elongated structural object O2 as a guide.

(Effects)

Accordingly, the drilling machine 1 and the method of manufacturing a drilled product do not require dedicated rails for moving the drilling machine 1. As a result, a structure of the drilling machine 1 can be simplified. In particular, the travelling structure 9 striding over the elongated structural object O2 can prevent dropping of the drilling machine 1 from the elongated structural object O2.

Furthermore, when holes have been arranged on at least one elongated structural object O2, the travelling structure 9 can travel stably by inserting the projections 29 of the travelling structure 9 into the holes of the elongated structural object O2. In particular, when at least two of the projections 29 are simultaneously inserted into the holes of the elongated structural object O2, the tool axis can be directed perpendicular to the array direction of the holes on the elongated structural object O2. Furthermore, even when a plurality of the travelling structures 9 travel on a plurality of the elongated structural objects O2 on which array directions of holes are not parallel, forming the projections 29, to be inserted into the holes of the elongated structural object O2, only on one of the travelling structures 9 makes it possible to direct the tool axis direction in an appropriate direction without influence by the elongated structural object O2 which is not an object to be drilled.

Furthermore, the drilling plates T to which the IC tags 30 have been attached, the position sensors 4, and the IC tag reader 5 allow of specifying positions of the drilling plates T, drilling positions, and the drilling structure 2 used for drilling. Thereby, even when the elongated structural object O2 has a complicated structure, the drilling structure 2 can be positioned by travelling of the travelling structures 9 without depending on the structure of the elongated structural object O2.

As described above, the drilling machine 1 and the method of manufacturing a drilled product allow of using even the elongated structural object O2, such as a seat rail, which has an irregular structure and is not a rail for travelling originally, as a guide for travelling, by a structural feature and a feature with regard to control.

Furthermore, the drilling machine 1 has a structure in which the drilling structures 2 can be easily attached to the travelling machine 3 and detached from the travelling machine 3. Thereby, in the case of carrying the drilling machine 1, the drilling machine 1 can be carried after detaching the drilling structures 2. That is, the drilling machine 1 can be easily carried by attaining a weight reduction of the drilling machine 1 at the time of carrying the drilling machine 1.

Furthermore, in the case of attaching, detaching, or replacing a drill, the attachment, detachment, or replacement of the drill can be performed in a state where the drilling structures 2 have been detached from the travelling machine 3. Thus, labor required for setup work including attachment, detachment, or replacement of a drill can be reduced. In particular, when the drilling structure 2 is a general drill driving device, the drilling structure 2 can also be used for drilling in a state where the drilling structure 2 has been detached from the travelling machine 3.

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

In the above-mentioned implementation, an example case where the plural travelling structures 9 travel on the top surfaces of the elongated structural objects O2, respectively, has been described. Nevertheless, one of the travelling structures may travel on a plate-like part O1. In that case, the travelling structure which travels on the plate-like part O1 can have a simple structure, such as a wheel.

When the plate-like part O1 has a curved surface, the height of the drilling structure 2 may change to a non-negligible extent by travelling on the plate-like part O1. For that reason, the drilling structure 2 may be provided with a moving structure which moves the drilling structure 2 in the height direction, i.e., in the direction perpendicular to both the travelling direction of the travelling machine 3 and the feed direction of a tool. That is, a moving structure which moves the drilling structure 2 in the two dimensional direction may be installed in the travelling machine 3.

Nevertheless, as the implementation described above, when a moving structure of each drilling structure 2 installed on the travelling machine 3 has only the feed structure 8 which performs a one-dimensional movement of the drilling structure 2, the number of necessary drive axes and motors can be reduced compared to the case of performing a two-dimensional movement of the drilling structure 2. Thus, a weight reduction of the drilling machine 1 can be attained. Therefore, when the plate-like part O1 composing the object O to be drilled has a curved surface, it leads to a weight reduction of the drilling machine 1 to make the plural travelling structures 9 travel on the top surfaces of the elongated structural objects O2, respectively, and to make a moving structure of each drilling structure 2 installed on the travelling machine 3 be composed of only the feed structure 8 which performs a one-dimensional movement. In that case, an adjusting structure of a position, such as a height, of the drilling structure 2, which is not driven by a motor, may be installed on the travelling machine 3 as necessary.

Furthermore, in the above-mentioned implementation, an example case where the IC tags 30 are attached to the drilling plates T has been described. Alternatively, the IC tags 30 may be attached on arbitrary positions of the object O to be drilled as long as information in the IC tags 30 can be read by the IC tag reader 5. Meanwhile, the position sensors 4 may detect a position of the object O to be drilled, instead of positions of the drilling plates T.

What is claimed is:

1. A drilling machine comprising:
   a drilling structure that drills an object to be drilled composed of at least one structural object which extends in a first direction from a platy part; and
   a travelling machine that positions the drilling structure in a travelling direction of the travelling machine by travelling in a longitudinal direction of the at least one structural object using the at least one structural object as a guide, an axis of the drilling structure being arranged in a second direction perpendicular to the first direction and the travelling direction of the travelling machine,
   wherein the travelling machine comprises a travelling structure that travels along a top surface of the at least one structural object and drives the drilling machine in the travelling direction, as the axis of the drilling structure intersects a side surface of the at least one structural object.

2. The drilling machine according to claim 1,
   wherein the at least one structural object comprises elongated structural objects each having the top surface,
   the platy part on which the elongated structural objects are disposed is a non-flat platy part, and
   the travelling structure comprises a plurality of travelling structures that travel on at least two of the elongated structural objects.

3. The drilling machine according to claim 2,
   wherein the travelling machine has an adjusting structure that adjusts an interval between the plurality of travelling structures.

4. The drilling machine according to claim 2,
   wherein the at least one structural object has holes along the travelling direction of the travelling machine, and
   the travelling structure has at least one projection fitting into the holes.

5. The drilling machine according to claim 2,
   wherein the at least one structural object comprises elongated structural objects, and
   the travelling machine is adapted to travel using one elongated structural object out of the elongated structural objects as a guide, the one elongated structural object being selected suitably from the elongated structural objects.

6. A method of manufacturing a drilled product using the drilling machine according to claim 2.

7. The drilling machine according to claim 1,
   wherein the at least one structural object comprises elongated structural objects, and
   the travelling machine is adapted to travel using one elongated structural object out of the elongated structural objects as a guide, the one elongated structural object being selected suitably from the elongated structural objects.

8. The drilling machine according to claim 1, further comprising:
a sensor that detects a position of a drilling plate attached to the object to be drilled; and
a controlling circuit that controls the travelling direction of the travelling machine based on the position of the drilling plate detected by the sensor.

9. The drilling machine according to claim 1, further comprising:
a reader that reads information recorded on an integrated circuit tag attached directly or indirectly to the object to be drilled; and
a controlling circuit that controls the travelling machine based on the information read by the reader.

10. The drilling machine according to claim 1,
wherein the drilling structure is coupled directly or indirectly to the travelling machine by a removable structure.

11. A method of manufacturing a drilled product using the drilling machine according to claim 1.

12. The drilling machine according to claim 1, further comprising:
a travelling motor; and
a drive shaft extending in the second direction and connecting the travelling motor to the travelling structure to drive the travelling structure.

13. The drilling machine according to claim 12, wherein the travelling structure comprises a sprocket and an end of the drive shaft is connected to the sprocket, and the drive shaft rotates the sprocket to drive the drilling machine in the travelling direction.

14. A drilling machine comprising:
a drilling structure that drills an object to be drilled composed of at least one structural object which extends in a first direction from a platy part; and
a travelling machine that positions the drilling structure in a travelling direction of the travelling machine by travelling in a longitudinal direction of the at least one structural object using the at least one structural object as a guide, an axis of the drilling structure being arranged in a second direction perpendicular to the first direction and the travelling direction of the travelling machine,
wherein the travelling machine comprises a travelling structure that travels along a top surface of the at least one structural object, and the axis of the drilling structure intersects a side surface of the at least one structural object,
wherein the at least one structural object has holes along the travelling direction of the travelling machine, and
the travelling structure has at least one projection fitting into the holes.

15. The drilling machine according to claim 14,
wherein the at least one projection comprises projections simultaneously fitting into at least two holes out of the holes.

16. The drilling machine according to claim 15,
wherein the travelling structure comprises a plurality of travelling structures that travel at positions far from each other in a direction different from the travelling direction, only one travelling structure out of the plurality of travelling structures having the projections simultaneously fitting into the at least two holes out of the holes.

17. The drilling machine according to claim 16,
wherein the at least one structural object comprises elongated structural objects, and
the travelling machine is adapted to travel using one elongated structural object out of the elongated structural objects as a guide, the one elongated structural object being selected suitably from the elongated structural objects.

18. The drilling machine according to claim 16,
wherein the travelling machine has an adjusting structure that adjusts an interval between the plurality of travelling structures.

19. The drilling machine according to claim 15,
wherein the at least one structural object comprises elongated structural objects, and
the travelling machine is adapted to travel using one elongated structural object out of the elongated structural objects as a guide, the one elongated structural object being selected suitably from the elongated structural objects.

20. The drilling machine according to claim 14,
wherein the at least one structural object comprises elongated structural objects, and
the travelling machine is adapted to travel using one elongated structural object out of the elongated structural objects as a guide, the one elongated structural object being selected suitably from the elongated structural objects.

21. A method of manufacturing a drilled product using the drilling machine according to claim 14.

22. A tool comprising:
a tool structure that operates on an object comprising a platy part and a structural object extending in a first direction from the platy part; and
a travelling machine that positions the tool structure in a travelling direction of the travelling machine by travelling in a longitudinal direction of the structural object using the structural object as a guide, an axis of the tool structure being arranged in a second direction perpendicular to the first direction and the travelling direction of the travelling machine,
wherein the travelling machine comprises a travelling structure that travels along a top surface of the structural object and drives the drilling machine in the travelling direction, as the axis of the tool structure intersects a side surface of the structural object.

* * * * *